(12) United States Patent
Ishigaki

(10) Patent No.: US 7,177,665 B2
(45) Date of Patent: Feb. 13, 2007

(54) E-MAIL HANDLING METHOD FOR PORTABLE TELEPHONE AND PORTABLE TELEPHONE USING SAID HANDLING METHOD

(75) Inventor: Junji Ishigaki, Hachioji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 535 days.

(21) Appl. No.: 09/794,419

(22) Filed: Feb. 27, 2001

(65) Prior Publication Data

US 2001/0046886 A1  Nov. 29, 2001

(30) Foreign Application Priority Data

Feb. 29, 2000  (JP)  ............................. 2000-054922

(51) Int. Cl.
*H04B 1/18* (2006.01)
*H04M 1/00* (2006.01)
*G06F 15/16* (2006.01)

(52) U.S. Cl. ................ 455/556.2; 455/566; 455/550.1; 455/158.4; 345/169; 345/333; 709/204; 709/205; 709/206

(58) Field of Classification Search ................ 455/566, 455/550.1, 556.2, 158.4, 158.5; 345/169, 345/333; 709/204, 205, 206
See application file for complete search history.

(56) References Cited

U.S. PATENT DOCUMENTS

| 5,541,988 | A  |   | 7/1996  | Draganoff |
|-----------|----|---|---------|-----------|
| 5,875,403 | A  | * | 2/1999  | Christal ...................... 455/566 |
| 6,282,435 | B1 | * | 8/2001  | Wagner et al. .............. 455/566 |
| 6,308,151 | B1 | * | 10/2001 | Smith .......................... 704/235 |
| 6,473,609 | B1 | * | 10/2002 | Schwartz et al. ........... 455/406 |

FOREIGN PATENT DOCUMENTS

| EP | 0 751 627 A2 | 6/1996 |
|----|--------------|--------|
| JP | 11-065962 | 3/1999 |
| JP | 11-316762 | 11/1999 |
| WO | WO 99/16181 | 4/1999 |

* cited by examiner

*Primary Examiner*—Matthew Anderson
*Assistant Examiner*—Yuwen Pan
(74) *Attorney, Agent, or Firm*—Pearne & Gordon LLP

(57) ABSTRACT

A "mail" icon is selected (step 51). The e-mal processing is activated and the e-mail screen is displayed (step 52). Next, Whether e-mail processing is selected or not is determined (step 53). If selected, the "e-mail list" is displayed (step 54). An e-mail is selected and the corresponding body of the e-mail is displayed on the first screen (step 55).

6 Claims, 5 Drawing Sheets

HEADER OF MAIL

HEADER OF MAIL

E-MAIL HANDLING METHOD FOR PORTABLE TELEPHONE AND PORTABLE TELEPHONE USING SAID HANDLING METHOD

BACKGROUND OF THE INVENITON

The present invention relates to an e-mail handling method in a portable telephone set having the non-voice information communications mode (for example information mode so called as i-mode) feature and adapted to display the body of an e-mail on a first screen when an incoming e-mail is downloaded. The non-voice information communications mode is the operation mode for the online data service using digital portable telephone sets, in that a service to connect to sites (contents) registered in a center, an internet connection service, a message service, and e-mail service are available.

Conventionally, a received e-mail is usually displayed starting with the header section on a first screen, and the body of the e-mail is not necessarily displayed on the first screen, in a portable telephone set (portable telephone set having the non-voice information communications mode) where an icon selected on an icon screen is scaled up on a display and operation of a selected icon is executed via operation of a selection key. This mechanism is not favored by users who wish to read the body of an e-mail as soon as possible.

The invention, proposed to solve such a problem, aims at providing an e-mail handling method in a portable telephone set whereby only the body of an e-mail is displayed on a display screen when a received e-mail is downloaded, and a portable telephone set using the e-mail handling method.

SUMMARY OF THE INVENTION

The first aspect of the invention is an e-mail handling method in a portable telephone set, in that only the body of an e-mail is displayed on the display screen when the user activates the e-mail operation mode in a portable telephone set having the e-mail function to display a list of e-mails and instructs reading of a specific e-mail in the e-mail list. This configuration supports the user's needs to read the body of an e-mail as soon as possible.

The second aspect of the invention is an e-mail handling method in a portable telephone set, characterized in that the body of an e-mail is displayed on a first screen when an e-mail list is displayed and reading of e-mails is instructed, in case a selected icon is an e-mail icon in a portable telephone set where selected operation on the screen related to icons is executed. This configuration supports the user's needs to read the body of an e-mail as soon as possible.

The third aspect of the invention is an e-mail handling method in a portable telephone set, in addition to the first or second aspect of the invention, in that a header section other than the body of the e-mail can be displayed by operating up or down scroll keys in case only the body of the e-mail is displayed. This configuration supports the user's needs to read the body of an e-mail as soon as possible and allows the user to check the header section at any time.

The fourth aspect of the invention is an e-mail handling method in a portable telephone set, in that a boundary line is inserted at the boundary of the body of the e-mail and the header section in order to specify the boundary of the body of the e-mail and the header-section. This configuration allows the user to check the boundary of the body of the e-mail and the header section in a simple fashion.

The fifth aspect of the invention is an e-mail handling method in a portable telephone set, in addition to first or second aspect of the invention, in that an e-mail address or a telephone number and a title or part of a title are displayed. This configuration allows the user to check bibliographical items other than the body of an e-mail via an e-mail list.

The sixth aspect of the invention is an e-mail handling method in a portable telephone set, in that only a name is displayed in case the telephone number matches a telephone number registered in a telephone directory and the name is registered in the telephone directory. This configuration allows the user to check the sender's name in case the telephone number matches a telephone number registered in a telephone directory and the name is registered in the telephone directory.

The seventh aspect of the invention is portable telephone set that uses an e-mail handling method in a portable telephone set-according to any one of claims 1 through 6 to read e-mails. This configuration supports the user's needs to read the body of an e-mail as soon as possible.

DETAILED DESCRIPTION OF THE PREFERRED EMBODIMENTS

An embodiment of the invention will be described referring to FIGS. 1 through 5.

Figure 1:
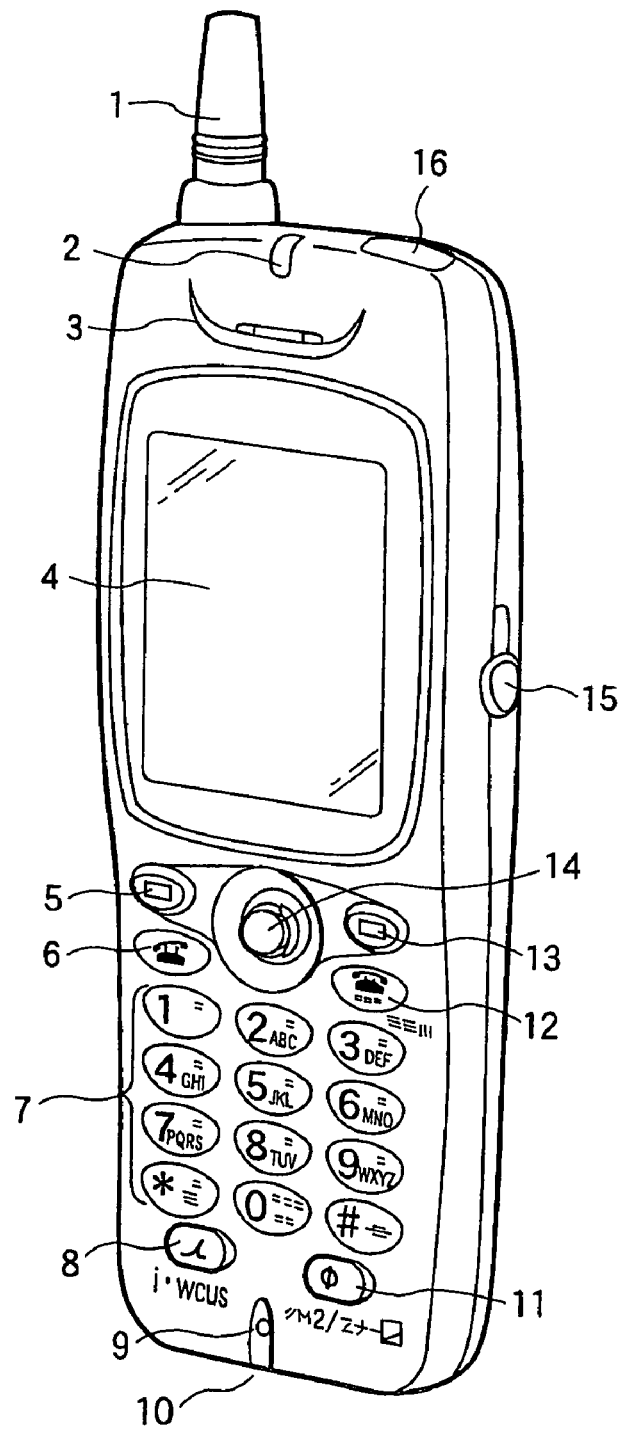
FIG. 1 is a front view showing a configuration of a portable telephone set according to an embodiment of the invention.

FIG. 1 is a schematic diagram showing the structure of portable telephone set equipped with the non-voice information communications mode (for example i-mode) feature according to the embodiment of the invention. In FIG. 1, the portable telephone set according to the embodiment of the invention comprises an antenna 1, a call termination/charge lamp 2, a receiver 3, an LCD display 4, a left soft key 5 also serving as a telephone directory button, a call start button 6, a ten-digit keypad or dial keys 7, a warp key 8 for warping to the non-voice information communications operation mode, a transmitter 9, an external connection terminal 10, a voice/manner key 11, a power/end/hold key 12, a right soft key 13 also serving as a redial/clear button, a navigation key 14 for scrolling through the display in four directions (up, down, right and left) and determining the target display by pressing the center button, an earphone microphone terminal 15, and an infrared communications port 16.

Figure 2:
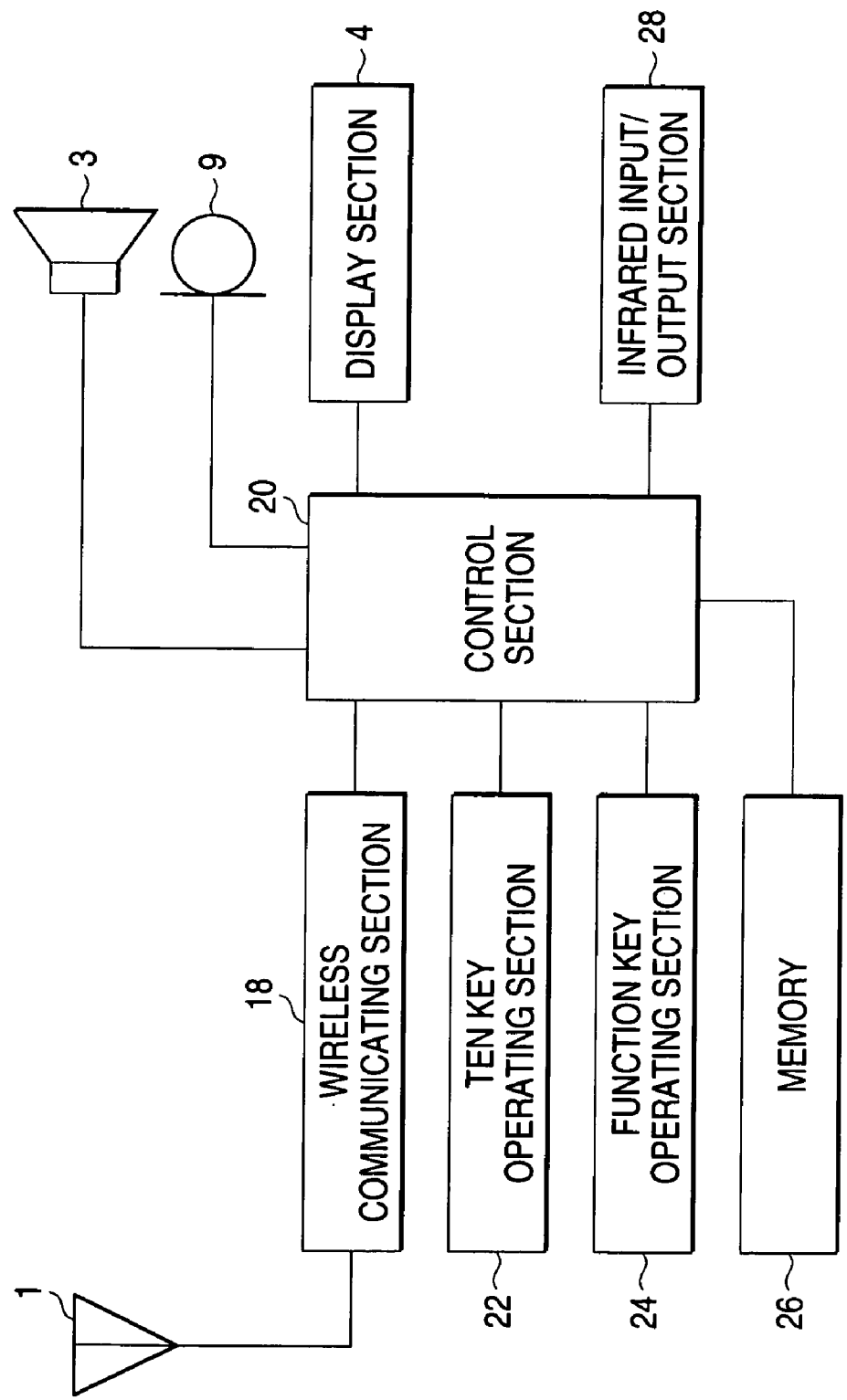
FIG. 2 shows a circuit block for realizing the portable telephone set in FIG. 1.

FIG. 2 shows a circuit block for realizing a portable telephone set of the aforementioned configuration. In FIG. 2, the portable telephone set receives radio waves via the antenna 1 at a receiver (not shown) in a radio communications section 18. Received information is transmitted to a controller 20. The controller 20 displays the received information such as the received telephone number on the display such as an LCD. The controller 20 converts the received information to voice information and outputs in voice via a speaker (receiver) 3 of the receiver section. A transmitter (microphone) 9 receives the user's voice and transmits the voice to the controller 20, which transmits the voice information to the distant party via radio communications by way of a transmitter (not shown) in the radio communications section 18 and the antenna 1.

The controller 20 stores voice information such as speech contents during conversation in a memory 26 or reads information therefrom. A ten-digit keypad operation section 22 inputs dial signals to the controller 20 via operation of the ten-digit keypad 7. A function key operation section 24 inputs operation of a function key, such as operation of the navigation key 14 to the controller 20.

Received e-mail information reaches the controller 20 via the antenna 1 and the radio communications section 18, then stored into the memory 26. When the controller 20 activates the e-mail operation mode and displays a list of e-mails then instructs reading of a specific e-mail in the list, only the body of the e-mail appears on the display 4. An infrared input/output section 28 transmits/receives infrared signals via the infrared communications port 16. These circuit blocks are housed in the cabinet in FIG. 1.

Figure 3:
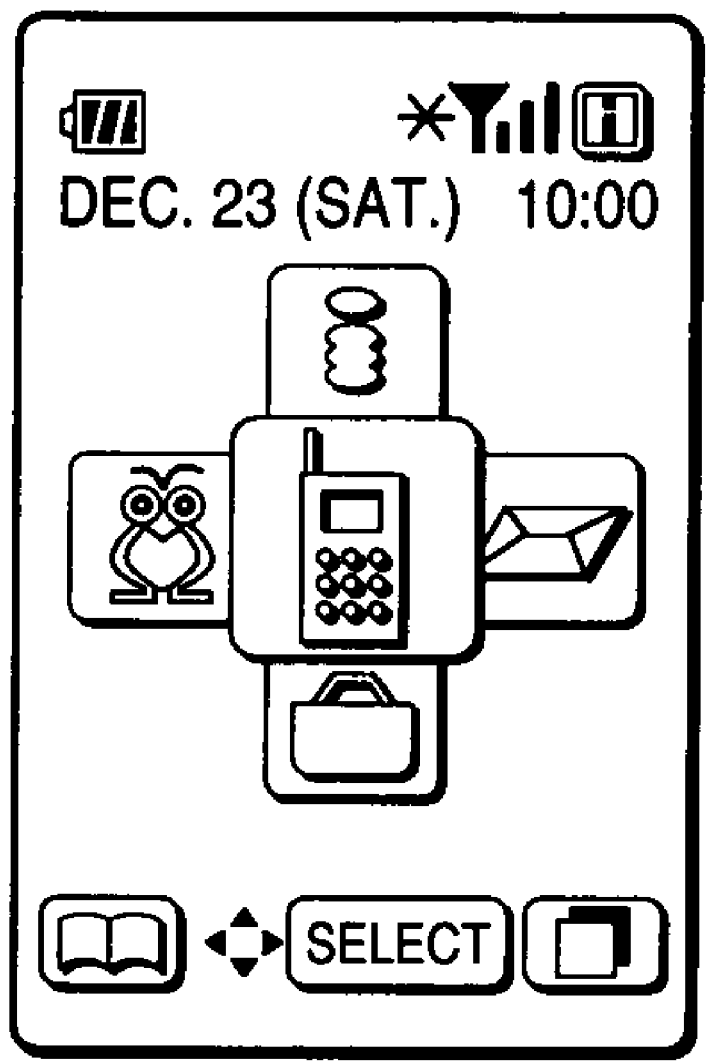
FIG. 3 shows an example of an icon screen displayed on the display of the portable telephone set in FIG. 1 in the call incoming wait state.

FIG. 3 shows an example of an icon screen displayed in the call incoming wait state. In this example, the icon screen is displayed in the shape the icon screen is displayed in a cross. From top to down in clockwise direction, an i-mode main icon, an i-mode mail icon, a telephone directory icon, a screen icon, and a menu icon in the center are respectively displayed. A selected icon screen is displayed in a scaled-up image to indicate which icon screen is currently selected.

Figure 4A:
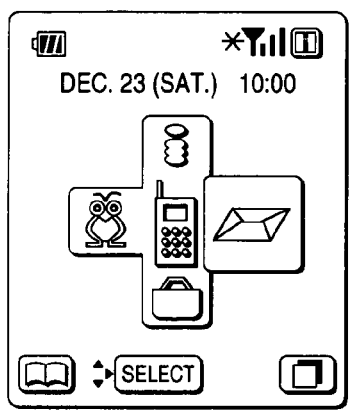
FIG. 4 shows a transition of the display screen of a portable telephone set to describe the embodiment of the invention.

FIGS. 4A to 4D show a transition of the display screen of a portable telephone set to describe the embodiment of the invention. In the portable telephone set according to this embodiment, an icon selected on an icon screen displayed as shown in FIG. 4A, that is, the "mail" icon is displayed in a scaled-up image. In this state, operation of the center key of the navigation key 14 enters the e-mail processing operation and displays the e-mail processing screen.

Figure 4B:
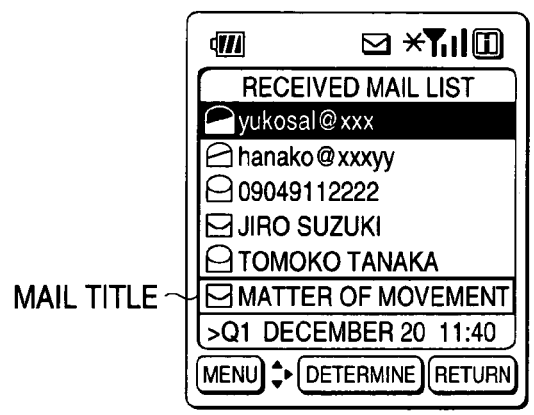

When the "list of received e-mails" is selected while the e-mail screen is displayed, the "list of received e-mails" is displayed as shown in FIG. 4B. In the "list of received e-mails" display, a list of received e-mails, whether open or unopen, is displayed. In this e-mail list display, an e-mail address, a telephone number and a name are displayed n the screen. Together with this, the title or part of the title of a highlighted received e-mail is displayed.

In FIG. 4B, the title of a highlighted received e-mail is displayed in the title area of the e-mail. Also the received e-mail number and date of reception are also displayed. In case the title is long, part of the title is displayed. On the left side of the area showing the list of received e-mails appear illustrations to show open e-mails and unopen e-mails (that is, icon of an open or unopen envelope).

In case the telephone number of the sender of an e-mail matches a telephone number in the telephone directory, and the name is registered in the telephone directory, the name is displayed as a first precedence.

Figure 4C:

When the user sees the list of received e-mails in FIG. 4B and selects the fourth unopened e-mail from the top, the first screen looks like FIG. 4C and only the corresponding body of the e-mail is displayed on the screen. To display the previous or next screen, the user presses upward or downward scroll key section of the navigation key 14.

Figure 4D:
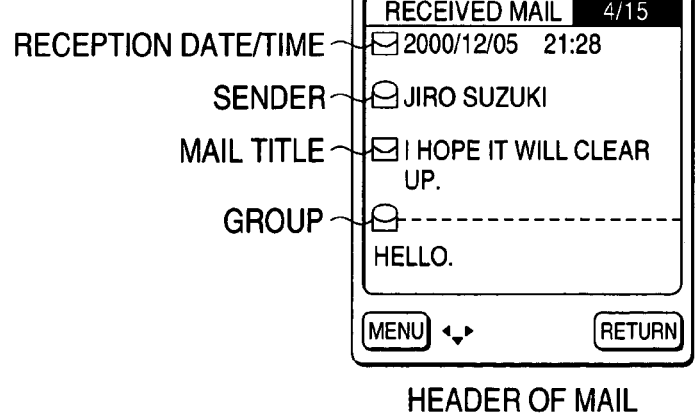

FIG. 4D shows an example where the previous screen of FIG. 4C is displayed. Received e-mails are arranged in the order of date of reception, the sender's name, the title of the e-mail, and the body of the e-mail. The body of the e-mail is displayed below a row comprising an open envelope mark and a broken line.

In order to display only the body of an e-mail on the first screen in FIG. 4C, the user easily edits and displays the area below the broken line via for example e-mail browser software, since the broken line specifies the boundary of the header section and the body of the e-mail, as understood from the arrangement of the aforementioned received e-mails.

While the foregoing description has illustrated exclusively the processing of received e-mails, processing on outgoing e-mails is also within the scope of the invention.

Figure 5:
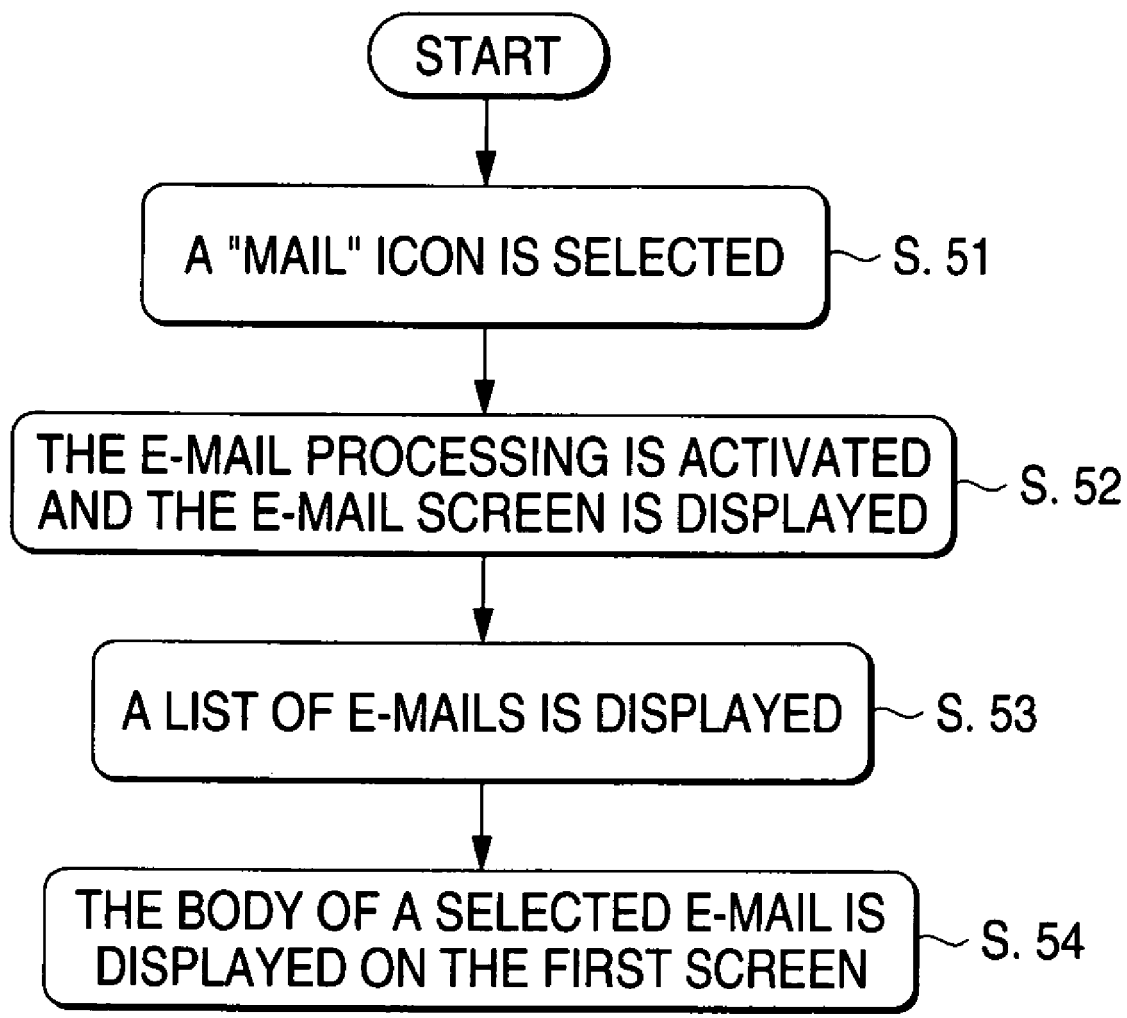
FIG. 5 is a flowchart explaining the operation to display only the body of an e-mail on the first screen.

FIG. 5 is a flowchart explaining the operation to display only the body of an e-mail on the first screen.

In FIG. 5, a "mail" icon is selected (step 51). By doing so, for example an e-mail browser control program operates, activating the e-mail processing as well as displaying the e-mail screen (step 52). Next, Whether e-mail processing is selected or not is determined (step 53). If selected, the "e-mail list" is displayed (step 54). An e-mail is selected and the corresponding body of the e-mail is displayed on the first screen (step 55).

As mentioned earlier, the first aspect of the invention is an e-mail handling method in a portable telephone set, in that only the body of an e-mail is displayed on the display screen when the user activates the e-mail operation mode in a portable telephone set having the e-mail feature to display a list of e-mails and instructs reading of a specific e-mail in the e-mail list. This configuration has an advantage that it supports the user's needs to read the body of an e-mail as soon as possible.

The second aspect of the invention is an e-mail handling method in a portable telephone set, in that only the body of an e-mail is displayed on a first screen when an e-mail list is displayed and reading of e-mails is instructed, in case a selected icon is an e-mail icon in a portable telephone set where selected operation on the screen related to icons is executed. This configuration has an advantage that it supports the user's needs to read the body of an e-mail as soon as possible.

The third aspect of the invention is an e-mail handling method in a portable telephone set, in addition to the first or second aspect of the invention, in that a header section other than the body of the e-mail can be displayed by operating up or down scroll keys in case only the body of the e-mail is displayed. This configuration has advantages that it supports the user's needs to read the body of an e-mail as soon as possible and allows the user to check the header section at any time.

The fourth aspect of the invention is an e-mail handling method in a portable telephone set, in that a boundary line is inserted at the boundary of the body of the e-mail and the header section in order to specify the boundary of the body of the e-mail and the header section. This configuration has an advantage that it allows the user to check the boundary of the body of the and the header section in a simple fashion.

The fifth aspect of the invention is an e-mail handling method in a portable telephone set, in addition to the first or second aspect of the invention, in that an e-mail address or a telephone number and a title or part of a title are displayed. This configuration has an advantage that it allows the user to check bibliographical items other than the body of an e-mail via an e-mail list.

The sixth aspect of the invention is an e-mail handling method in a portable telephone set, in that only a name is displayed in case the telephone number matches a telephone number registered in a telephone directory and the name is registered in the telephone directory.

The seventh aspect of the invention is portable telephone set that uses an e-mail handling method in a portable telephone set according to any one of the first through sixth aspects of the invention to read e-mails.

What is claimed is:

1. An e-mail handling method in a portable telephone set where selected operation on the screen related to icons is executed, comprising the steps of:
   displaying an e-mail list of received e-mails in case a selected icon is an e-mail icon in a portable telephone set;
   selecting a specific e-mail in the e-mail list to be displayed; and
   displaying only a content of an e-mail on a first screen, wherein the content of the e-mail does not include a header section of the e-mail.

2. An e-mail handling method in a portable telephone set according to claim 1, wherein the header section other than said content of the e-mail can be displayed by operating up or down scroll keys in case only said body of the e-mail is displayed.

3. An e-mail handling method in a portable telephone set according to claim 2, wherein a boundary line is inserted at the boundary of said content of the e-mail and said header section in order to specify the boundary of said content of the e-mail and said header section.

4. An e-mail handling method in a portable telephone set according to claim 1, wherein a combination of an e-mail address or a telephone number, and a title or part of a title is displayed.

5. An e-mail handling method in a portable telephone set according to claim 4, wherein only a name is displayed in case said telephone number matches a telephone number registered in a telephone directory and said name is registered in said telephone directory.

6. A portable telephone set that uses an e-mail handling method in a portable telephone set according to claim 1 to read e-mails.

* * * * *